US008254888B2

(12) United States Patent
Turk

(10) Patent No.: US 8,254,888 B2
(45) Date of Patent: Aug. 28, 2012

(54) DATA MESSAGE MANAGEMENT SYSTEM

(76) Inventor: Marc Timothy Turk, Kwazulu-Natal (ZA)

( * ) Notice: Subject to any disclaimer, the term of this patent is extended or adjusted under 35 U.S.C. 154(b) by 851 days.

(21) Appl. No.: 12/226,809

(22) PCT Filed: Mar. 6, 2007

(86) PCT No.: PCT/ZA2007/000017
§ 371 (c)(1),
(2), (4) Date: Feb. 3, 2009

(87) PCT Pub. No.: WO2008/017084
PCT Pub. Date: Feb. 7, 2008

(65) Prior Publication Data
US 2009/0239504 A1 Sep. 24, 2009

(30) Foreign Application Priority Data

Mar. 6, 2006 (ZA) .................... 2006/01193
Nov. 6, 2006 (ZA) .................... 2006/09203

(51) Int. Cl.
*H04M 3/493* (2006.01)
*H04M 3/00* (2006.01)
*H04W 4/00* (2009.01)
*G06F 15/16* (2006.01)

(52) U.S. Cl. ............ 455/412.1; 455/418; 455/466; 709/206; 709/219

(58) Field of Classification Search ......... 455/410–411, 455/412.1–412.2, 418, 432.3, 435.1, 445, 455/466, 550.1, 551, 556.2, 560–561, 566, 500, 507–508, 514, 517; 709/202–203, 206, 709/216, 219, 228–229, 242; 715/752, 758, 715/733, 741–744, 747; 370/310, 312–313, 370/328; 713/179–181; 707/E17.032, E17.037, 707/E17.045
See application file for complete search history.

(56) References Cited

U.S. PATENT DOCUMENTS

| | | | |
|---|---|---|---|
| 6,195,686 B1 * | 2/2001 | Moon et al. ........... | 709/206 |
| 7,117,528 B1 * | 10/2006 | Hyman et al. .......... | 726/5 |
| 7,224,778 B2 * | 5/2007 | Aoki ................. | 379/88.23 |
| 7,269,624 B1 * | 9/2007 | Malik ................ | 709/206 |
| 7,515,906 B2 * | 4/2009 | Zou et al. ............ | 455/433 |
| 7,570,655 B2 * | 8/2009 | Hassan et al. ......... | 370/428 |
| 7,590,697 B2 * | 9/2009 | Ito et al. ............ | 709/206 |
| 7,882,193 B1 * | 2/2011 | Aronson et al. ........ | 709/207 |
| 7,907,716 B2 * | 3/2011 | Stuckman et al. ...... | 379/211.01 |
| 7,996,470 B2 * | 8/2011 | Daniell .............. | 709/206 |
| 2002/0120692 A1 * | 8/2002 | Schiavone et al. ..... | 709/206 |
| 2004/0122906 A1 * | 6/2004 | Goodman et al. ...... | 709/206 |
| 2006/0031327 A1 * | 2/2006 | Kredo ............... | 709/206 |

* cited by examiner

*Primary Examiner* — Meless Zewdu
(74) *Attorney, Agent, or Firm* — Birch, Stewart, Kolasch & Birch, LLP

(57) ABSTRACT

A system and method to manage data messages exchanged between normally un-connected message clients, the data message management system including a participating message handling server and one or more participating message originating clients, which, in use, are configured to transmit one or more data messages to addressee clients, the addressee clients being one of participants in the system and non-participants in the system.

9 Claims, 2 Drawing Sheets

DATA MESSAGE MANAGEMENT SYSTEM

BACKGROUND TO THE INVENTION

This invention relates to a data message management system and to methods of operating such a system.

Data messages, such as e-mail and short message system (SMS) messages have become ubiquitous, but are difficult to manage. Often the amount of messages sent and received and the currently un-administered nature of such messages have the effect of swamping instead of facilitating communication.

It is an object of this invention to address this shortcoming.

SUMMARY OF THE INVENTION

According to this invention, a system is provided to manage data messages exchanged between normally unconnected message clients, the data message management system including at least one participating message handling server and one or more participating message originating clients, which, in use, require to transmit one or more data messages to addressee clients, which need not necessarily be participants in the system:

each participating message originating client being programmed with:
an outgoing message management program including a message routing program; and
one or more user-selectable message handling rules to be associated with outgoing data messages; and
each participating message handling server being programmed with:
a server message management program including the message routing program; and
a rules management program, which is adapted to interpret the user-selected message handling rule or rules associated with data messages routed to the server in use and to route the data messages, using the message routing program, in accordance with the user-selected message handling rule or rules associated with each data message;
the outgoing message management program being adapted:
to operate in conjunction with the data messaging system in use on the message originating client;
to permit the selection, in use by a user of the message originating client prior to transmission of an outgoing data message, of one or more user-selectable message handling rules to be associated with that outgoing data message;
to associate the user-selected message handling rule or rules with the outgoing data message on transmission thereof to one or more addressee message clients; and
to associate the message routing program with each outgoing data message that has a message handling rule associated therewith, on transmission of that outgoing data message to one or more addressee message clients; and
the message routing program being adapted to remain associated with the outgoing data message and all data messages linked thereto (whether as a reply, a copy or a forwarded copy of such an outgoing data message and with or without data (such as comments or reply text) additional thereto) and to direct all such linked data messages to a participating message handling server;
such that outgoing data messages with their associated message handling rules and all linked data messages, including data messages transmitted by addressee clients in response to the outgoing data message, are routed through a participating message handling server; and
the rules management program in the message handling server being programmed to control the transmission of reply data messages to the originating message client in accordance with the message handling rules associated with the outgoing data message.

It will be understood that the message originating clients and the message handling servers will have to be programmed with the outgoing message management program and the server message management program respectively to enable their participation in the system of the invention.

The message routing program in the server message management program may be similar to the message routing program in the outgoing message management program, but in view of the additional complexity of the tasks manage by the server, the message routing program used in the server will probably have added functionality in most applications.

The message handling rules associated or attached to data messages are preferably attached in background such that neither the message originating client nor the addressee clients display the message handling rules, but merely implement the message handling rules (the message originating client when sending and the addressee clients when responding).

In addition, besides being hidden from view, the message handling rules are preferably protected against removal, modification or variation by the message clients, with protection against unauthorised modification of the rules (hacking) being built in.

The message handling server may conveniently be programmed to prevent the transmission of linked data messages to the originating message client, pending compliance with all the message handling rules associated with the outgoing data message.

In a simplified embodiment of the invention, a system is provided to manage data messages exchanged between message clients, the data message management system including a plurality of participating message clients each adapted to receive incoming data messages only from a participating message handling server programmed with a database containing information pertaining to the identities of authorised senders of data messages to participating message clients, the participating message handling server being programmed to compare identity information pertaining to the sender of each data message incoming to each participating message client, which is contained in each such data message, to the database of authorised senders and, if the identity information is not recorded in the database, to recognise such a sender as an unauthorised sender and to implement a pre-programmed registration process by means of which the unauthorised sender may be registered in the database as an authorised sender by either or both the participating message client and the unauthorised sender. In the latter case, registration must require the participation or authorisation of the participating client and, if necessary the network administrator with network administration authority over that participating message client.

In the reverse of this embodiment of the invention, a system is provided to manage data messages exchanged between message clients, the data message management system including a plurality of participating message clients each adapted to transmit outgoing data messages only by way of a participating message handling server which is programmed with a database containing information pertaining to the identities of authorised recipients of data messages from participating message clients, the participating message handling server being programmed to compare the identity information pertaining to the recipient of each data message outgoing from each participating message client, which is contained in each such data message, to a database of authorised recipients held in the server and, if the identity information is not recorded in the database, to recognise such a recipient as an unauthorised recipient and to implement a pre-programmed registration process by means of which the unauthorised recipient may be registered in the database as an authorised recipient by either or both the participating message client and the unauthorised recipient. In the latter case, registration must require the participation or authorisation of the participating client and, if necessary the network administrator with network administration authority over that participating message client.

The above mentioned embodiments of the invention are preferably combined into a single system to manage data messages incoming to and outgoing from participating message clients.

The data message management system of the above mentioned embodiments of the invention of the invention is ideally suited to the management of data messages exchanged between message clients connected in a network and normally un-connected message clients (not connected into the network) and, in which event the or one of the message handling servers will conveniently be included in the network, the message routing program being adapted to route data messages outgoing from and incoming to networked message clients through the networked message handling server, the networked server including the database of authorised sender and recipient information and being programmed to implement the pre-programmed registration processes by means of which the senders and recipient may, in use, be registered in the database as authorised senders and recipients respectively.

The registration process may conveniently involve the automatic transmission of one or more on-line registration forms to either or both the networked message client on the one hand and, on the other hand, the un-connected recipient (in respect of data messages outgoing from message clients on the network) or the un-connected sender (in respect of data messages incoming to message clients on the network), which must be completed and retransmitted to the message handling server to register the recipient or sender in the database as a recognised recipient or sender respectively.

In one form of the inventions the data messages are constituted by e-mail, in which case the messaging system in use on the message client and addressee clients will comprise e-mail handling software, such as MICROSOFT OUTLOOK™, as their data messaging system.

The management system of the invention can also be used to manage cellular communications data, including voice data (analog or digital), message protocol data (such as short Message Service data (SMS point-to-point or SMS PP and SMS one-to-many or SMS Cell Broadcast), Multimedia Messaging Service data (MMS), Instant Messaging data (IM), Mobile Instant Messaging (MIM) or the like), General Packet Radio Service (GPRS) data, Wireless Application Protocol data (WAP) or any cellular communication data addressable to a cell phone. In this case the message clients will be constituted largely by cell phones and the data messaging system will be constituted by a cellular phone network.

In each case, the data messages sent as outgoing and reply data messages will be routed through the message handling server which may be a remote server computer located at the premises of an application service provider or a cellular service provider through which the outgoing data message are routed by way of the internet or cellular transmission networks.

Unless the context clearly does not permit such an interpretation, a reference to a cellular service provider in this specification, will be reference to the cellular service provider's computers on which the processes of this invention are implemented.

Alternatively the message handling server may be a local mail server computer located at the premises where the data message originating message client is located through which the outgoing data messages are routed by way of the intranet to which the server and client are connected.

As a further alternative, the message handling server may be constituted by message server software loaded onto the message originating client.

The message handling rules may include rules adapted to format, control and consolidate the data messages.

The invention includes a method of managing the transmission of data messages in a data message management system, which will be described below.

BRIEF DESCRIPTION OF THE DRAWINGS

The invention will be further described with reference to the accompanying drawings in which.

DESCRIPTION OF EMBODIMENTS OF THE INVENTION

Figure 1:
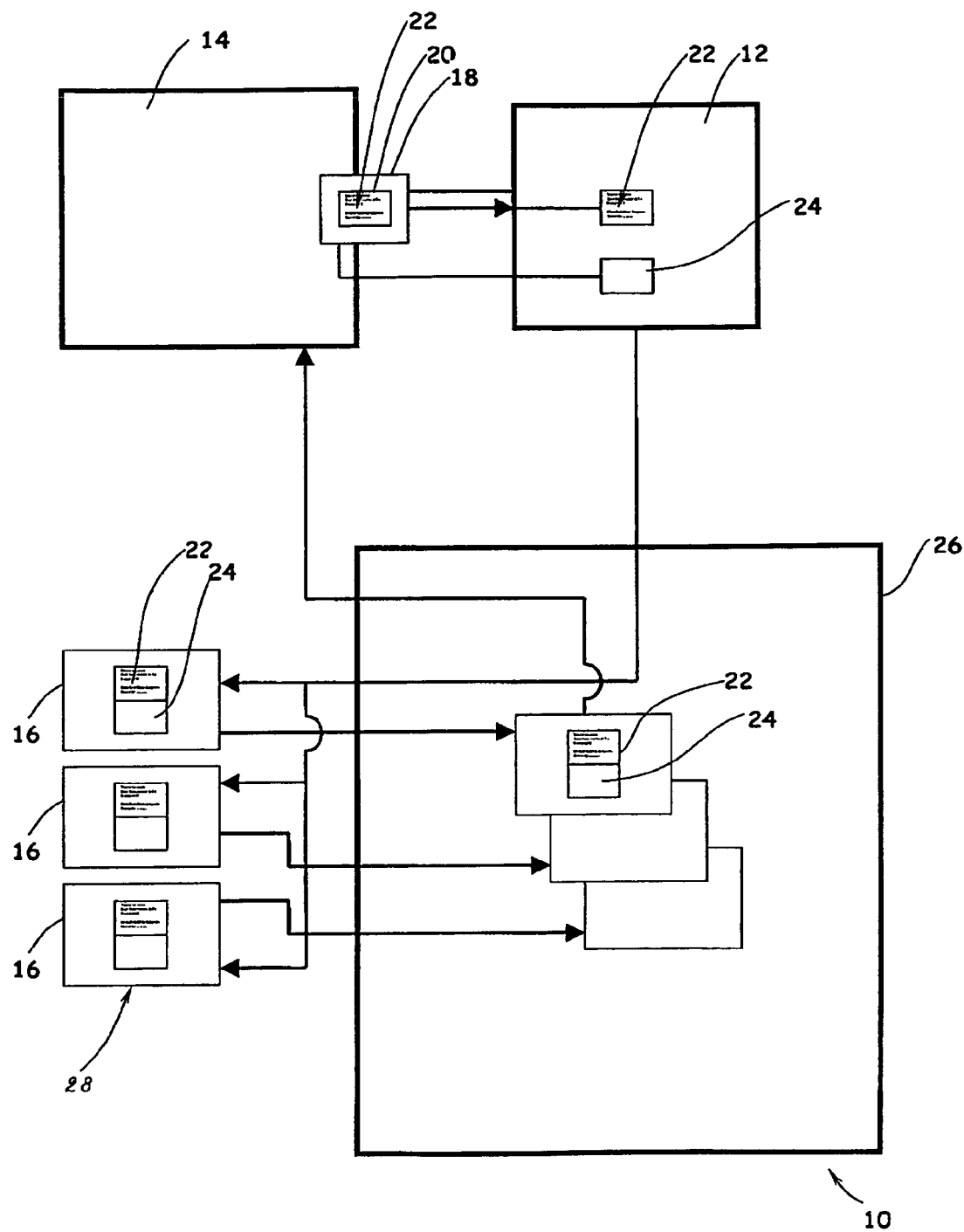
FIG. 1 is a block diagram of one implementation of the invention as an e-mail management system.

The data message management system 10 illustrated in FIG. 1 is intended to manage the transmission of data messages (in the form of e-mail messages) between a plurality of message clients in the form of personal computers.

The invention will be described with reference to the example of a single outgoing data message and the response thereto by a plurality of message clients.

The message clients can all be part of a single computer network or a wide area network, but for data messaging purposes they need not necessarily be connected.

The block diagram of FIG. 1 illustrates an exchange of e-mail correspondence between a number of message clients, commencing with an outgoing data message 12 transmitted from a message originating client 14 to a plurality of addressee clients 16.

Each of the message clients 14, 16 is programmed with a data message management program that first pops up or displays an input screen (the data message management program input screen 20) on its computer display when the user attempts to send an e-mail message (the data message 12) using a conventional messaging system, such as MICROSOFT OUTLOOK™.

Should the user wish to make use of the management system 10 to manage the outgoing data message 12 and the responses thereto, the user will then fill in the data message management program input screen 20 displayed on the computer display, the data message management program 18 being programmed to present the user with a number of message handling rules 22 from which the user makes a selection. The selected message handling rules 22 are then attached to the outgoing data message 12.

The data message management system 10 may conveniently be implemented such that use of the system 10 is not optional but compulsory. This may find greater application in corporate networks than on home computers where a corporate network administration will ensure that the user will not be able to proceed beyond the pop-up input screen 20 until certain mandatory message handling rules 22 have been selected, whether manually or automatically, for attachment to every outgoing data message 12.

The data message management program 18 also attaches a routing program 24 to the outgoing data message 12 and the outgoing data message 12 is then sent to the addressee client or clients 16 via the internet.

The routing program 24 automatically routes the outgoing data message 12 to the addressee clients 16 by way of a message handling server 26 which is programmed to implement the message handling rules 22 attached to the outgoing data message 12.

From the message handling server 26, the outgoing data message 12 is sent to the addressee clients 16. Should any one or more of the addressee clients 16 wish to respond to the outgoing data message 12, they will do so in the form of a reply data message 28.

In situations where an addressee client 16 is not a participating message client on the data message management system 10, it will not be programmed with the message management program and messages outgoing normally from the addressee client 16 will not normally have the message handling rules 22 attached to them. However, the outgoing data message 12 is seeded with a program to ensure that the message handling rules 22 attached to data messages 12 outgoing from the message handling server 26 are automatically attached to any linked data message, including any response to any outgoing data message 12 by the addressee client 16, whether as a reply, a copy or a forwarded copy of such an outgoing data message 12 and with or without data (such as comments or reply text) additional thereto. In this manner, the reply data message 28 is automatically directed and governed by the message handling rules 22.

The message handling rules 22 associated or attached to data messages in the system of the invention are attached in background such that neither the message originating client 14 nor the addressee clients 16 display the message handling rules, but merely implement the message handling rules (the message originating client 14 when sending and the addressee clients 16 when responding).

In addition, the message handling rules cannot be removed, modified or altered in any way by the message clients, with protection against unauthorised removal or modification of the rules (hacking) being built in.

The message handling rules 22 are automatically attached to the reply data message 28 to ensure that each reply data message 28 is routed back to the originating client 14 by way of the message handling server 26.

Apart from unsolicited e-mail (so-called "spam" mail), one of the most frequently complained-of failures of e-mail messaging systems is the inability of existing systems to aggregate replies in a logically consistent fashion and to associate such replies with the original outgoing e-mail message. This failure is overcome in the management system 10 by the inclusion of a message handling rule 22 that serves to consolidate all the reply data messages 28 pending fulfillment of conditions contained in the rule. So, for instance, the message handling rules 22 may contain a rule to the effect that all replies are to be retransmitted to the originating client 14 in a particular format and only when all responses have been received. To overcome delays, the message handling server 26 may conveniently be programmed to prompt the addressee clients automatically if a reply data message 28 has not been received from a particular addressee client by a predetermined date. As an adjunct to this rule, the message handling server 26 could be programmed to transmit the reply data messages 28 to the originating client 14 when the majority of addressee clients 16 have replied to the outgoing data message 12, reporting at the same time which addressee clients 16 have not replied.

This is but a small example of the management capacity of the management system 10 and of the message handling rules that can be supported by the system.

Referring generally to FIG. 1, in personal computer (PC) networks each networked PC is programmed to include a message or mail management program that is adapted to operate in conjunction with the e-mail system in use on the client PC, such as MICROSOFT OUTLOOK™. In such a networked environment, the mail management program of this invention associates a message or mail routing program and at least one predetermined mail handling rule to each outgoing e-mail sent by a networked mail originating PC 14 prior to transmission of the outgoing data message 12.

In addition, such PC networks typically include a mail handling server which can (but need not necessarily be) the message handling server 26 of FIG. 1 and which is normally constituted by a mail server PC forming part of the network. In such a network, the mail routing program is preferably adapted to route e-mail outgoing from and incoming to the networked PCs through the mail handling server.

This can be done instead of or in addition to routing e-mail outgoing from and incoming to the networked PCs through the message handling server 26.

The system includes a database which can be installed in the mail server instead of or in addition to the message handling server 26.

The database is used to record and store information pertaining to recognised recipients of mail outgoing from networked PCs as well as recognised senders of mail to PCs on the network.

In respect of outgoing mail, the mail server is programmed to compare at least the address of the intended recipient of each e-mail outgoing from networked PCs to recognised mail recipients recorded in the database. If the intended recipient's address is not recorded in the database, the mail server implements a pre-programmed registration process by means of which the intended recipient may, in use, be registered in the database as a recognised recipient.

The registration process will typically be implemented to invite the networked PC message originating client 14 to register the intended recipient by sending the message originating client 14 a registration form to complete. However, the invitation could, alternatively or in addition, be extended to the intended recipient, in which case, registration must require the participation or authorisation of the message originating client 14 and, if necessary the network administrator with network administration authority over that message originating client 14.

In respect of incoming mail, the system simply operates in reverse, the database containing at least the address information of recognised senders of data messages to PCs on the network and the mail server or message handling server 26 being programmed to compare the address of the sender of each incoming e-mail to the network to the record of recognised senders recorded in the database. If the address is not recorded in the database, the mail server implements the pre-programmed registration process to assist in registering the sender in the database as a recognised sender.

Once again, the registration process will typically be implemented to invite the networked PC message originating client 14 to register the unauthorised sender by sending the message originating client 14 a registration form to complete. However, the invitation to register could, alternatively or in addition, be extended to the unauthorised sender, in which case, registration must require the participation or authorisation of the message originating client 14 and, if necessary the network administrator with network administration authority over that message originating client 14.

In both cases, the registration process involves the automatic generation and transmission of one or more on-line registration forms to either or both the networked PC on the one hand and the unconnected recipient or sender (in respect of mail outgoing or incoming to the network respectively). The mail will only be cleared for transmission or receipt once the registration forms have been completed and retransmitted to the either or both the mail server and the message handling server 26 and the sender or recipient is correctly registered in the database as a recognised sender or recipient respectively.

In this way, network management is facilitated in that the network administrator is able to control, by means of automated rules and administrative procedures, which e-mail may be received by and sent to PCs on the network. This will serve to avoid and circumvent a large number of the problems, such as spam mail and identity theft, currently experienced as a result of essentially un-controllable e-mail usage, particularly if the database is supplemented with information about undesirable e-mail senders that is presently available in on-line databases.

Figure 2:
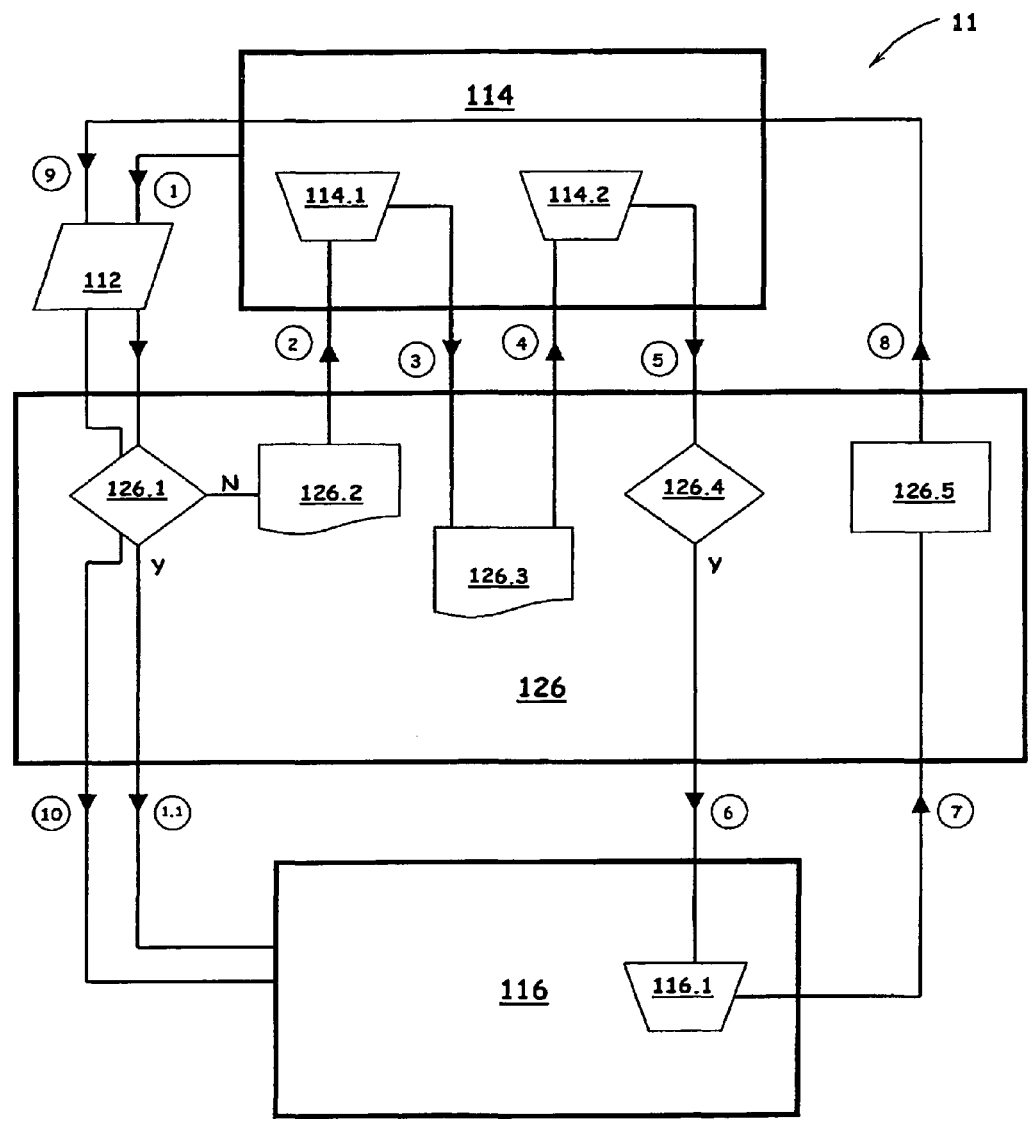
FIG. 2 is a block diagram of a second implementation of the invention as a system for the management of cellular communications data.

FIG. 2 illustrates, in block diagram form, an example of the implementation of the data message management system 10 of the invention in a cellular communication environment. In FIG. 2, the system is numbered 110 and like numbers (numbered in hundreds) are used to denote like components or functions compared to those illustrated with reference to FIG. 1.

This implementation contains a developed version of the registration process referred to above.

In FIG. 2, an originating client phone device 114 (which could be a cell phone, a personal digital assistant (PDA) or even a computer) sends an outgoing phone data message 112 to an addressee client phone 116. The outgoing phone data message 112 can be voice data (analog or digital), message protocol data (such as short Message Service data (point-to-point or SMS PP and SMS one-to-many or SMS Cell Broadcast), Multimedia Messaging Service data (MMS), Instant Messaging data (IM), Mobile Instant Messaging (MIM) or the like), General Packet Radio Service (GPRS) data, Wireless Application Protocol data (WAP) or any cellular communication data addressable to a cell phone.

Since all cellular phone data transmissions (calls and messages such as the outgoing phone data message 112) are first routed through a cellular service provider, the outgoing phone data message 112 is first sent to the cellular service provider 126 in respect of the addressee client phone 116 (arrow numbered 1). As it is done elsewhere in this specification, references to a cellular service provider in this example are in fact references to the cellular service provider's computers on which the processes of this example are implemented, unless the context clearly does not permit such an interpretation.

At the cellular service provider 126, the outgoing phone data message 112 is subjected to a decision making process 126.1 in which the sender information in respect of the outgoing phone data message 112 is compared to a database of permitted callers in respect of the addressee client phone 116.

The content of the permitted callers database is to some extent accessible to the user of the addressee client phone 116 using the facilities of the cellular service provider 126, such as online interactive internet applications. This allows the user a relatively convenient means of managing the content of the database of permitted callers and the permissions recorded in the database.

If the decision making process 126.1 yields a positive match, the outgoing phone data message 112 is routed directly to the addressee client phone 116 (arrow numbered 1.1).

If the decision making process 126.1 is negative in that the sender information in respect of the outgoing phone data message 112 does not match any entry in the database of permitted callers kept by the cellular service provider 126 in respect of the addressee client phone 116, the cellular service provider 126 automatically implements a registration process by means of which the originating client phone 114 (or its user) will be registered on the database of permitted callers kept by the cellular service provider 126 in respect of the addressee client phone 116.

To initiate the registration process the cellular service provider 126 generates a registration form request message 126.2 that is sent (arrow numbered 2) to the originating client phone 114 to prompt the user of the originating client phone 114 to request a registration form from the cellular service provider 126. The form request message 126.2 requires the originating client phone 114 to respond with a form request response. Where the originating client phone 114 is manually operated, the response will require manual input 114.1 but with a computer generated outgoing phone data message 112, the response can be automated. The form request message 126.2 is seeded with a short program that drives the originating client phone 114 to send a form request response back to the cellular service provider 126 (arrow numbered 3).

If a positive form request response is sent, indicating that the originating client phone 114 requires the transmission to it of a registration form, the cellular service provider 126 automatically generates a registration form 126.3 which is sent back to the originating client phone 114 (arrow numbered 4) which must be completed in a manual input step 114.2.

To avoid the computer-generated responses so commonplace in the spam mail industry, the form 126.3 contains a forced manual input mechanism that compels a considered, manual response 114.2. An example of such a mechanism is a humanly intelligible code or password that differs substantially from the digital code required to render the password visually. The password could, for instance, be visually represented in the form of a graphic or image visually representing a short alphanumeric code or password (typically 5 or 6 digits). The digital code that is required to render the password visually (for instance a *.jpg file) bears no relationship to the humanly intelligible password visible in the image.

The user of the originating client phone 114 must then input the visible code into a space provided on the form 126.3 and, using the forced manual input mechanism outlined above, must do so manually.

The form 126.3 is seeded with a short program that drives the originating client phone 114 to send the completed form back to the cellular service provider 126 on completion of the manual input process 114.2 (arrow numbered 5). The originating client phone 114 transmits the form with the code input therein to the cellular service provider 126 where it is converted into an authorisation request which is subjected to a automated decision making process 126.4 to verify the correctness of the code input in the manual input process 114.2.

If the input code is verified, an authorisation request is forwarded to the addressee client phone 116 (arrow numbered 6) where it is displayed as a form for a manual input process 116.1 in which the user of the addressee client phone 116 is required to either decline or allow the authorisation request. As an example of the control given to the user of the addressee client phone 116, the user may be given the choice of allowing one-time 8 access, unlimited access or access limited as to duration, time of access, frequency of access or numbers of individual access events permitted.

Should the user enter a decision allowing access, the authorisation request is seeded with a short program that drives the addressee client phone 116 to send a database modification authorisation (arrow numbered 7) to the cellular service provider 126 where a database modification process 126.5 is implemented to record the authorisation granted with the use of the addressee client phone 116.

At the same time, a retransmission advice (arrow numbered 8) is sent to the originating client phone 114. The retransmission advice is seeded with a program that drives the originating client phone 114 to retransmit the outgoing phone data message 112 to the addressee client phone 116 by way of the cellular service provider 126 (arrow numbered 9). Since the originating client phone 114 is now recorded on the database of permitted callers, the decision 126.1 will be positive and the outgoing phone data message 112 will be transmitted to the addressee client phone 116 (arrow numbered 10).

The registration process outlined above uses push and pull data transmissions between the cellular service provider 126, the originating client phone 114 and the addressee client phone 116 and in most cellular phone services, the user of the addressee client phone 116 will be required to bear the cost thereof, but most cell phone users will probably be prepared to pay the relatively low data transmission cost involved for the convenience of controlling access to their cell phones.

Spam message operators rely on the transmission of messages in bulk using completely automated processes. The imposition of a manual step in the transmission process (as proposed in the system of this invention) immediately renders the process non-viable from a spam mail point of view. In this way, the system of this invention seeks to introduce an additional benefit for the user of the addressee client phone 16.

The invention claimed is:

1. A system to manage data messages exchanged between normally un-connected message clients, the data message management system including a participating message handling server and one or more participating message originating clients, which, in use, are configured to transmit one or more data messages to addressee clients, the addressee clients being one of participants in the system and non-participants in the system:

each participating message originating client of the one or more participating message originating clients being programmed with:

an outgoing message management program including a message routing program; and one or more user-selected message handling rules to be associated with outgoing data messages; and the participating message handling server being programmed with:

a server message management program including the message routing program; and a rules management program, which is adapted to interpret the one or more user-selected message handling rules associated with outgoing data messages routed to the participating message handling server and to route the outgoing data messages, using the message routing program, in accordance with the one or more user-selected message handling rules associated with each outgoing data message;

the outgoing message management program being adapted:

to operate in conjunction with the data messaging system in use on the participating message originating client of the one or more participating message originating clients;

to permit the selection, by one or more participating users of the one or more participating message originating clients prior to transmission of an outgoing data message, of the one or more user-selected message handling rules to be associated with that outgoing data message;

to associate the one or more user-selected message handling rules with the outgoing data message on transmission thereof to the one or more addressee message clients; and to associate the message routing program with each outgoing data message that has a message handling rule associated therewith, on transmission of that outgoing data message to the one or more addressee message clients; and the message routing program being adapted to remain associated with the outgoing data message and all data messages linked thereto and to direct all such linked data messages to a the participating message handling server such that the outgoing data messages with their associated message handling rules and all said linked data messages, including data messages transmitted by the addressee clients in response to the outgoing data message, are routed through the participating message handling server; and the rules management program in the participating message handling server being programmed to control the transmission of reply data messages to the participating message originating message client of the one or more participating message originating clients in accordance with the message handling rules associated with the outgoing data message.

2. The data message management system according to claim 1 in which the participating message handling server is programmed to prevent the transmission of the linked data messages to the participating message originating message client of the one or more participating message originating clients, pending compliance with all the message handling rules associated with the outgoing data message.

3. The data message management system according to claim 1 in which the data messages are constituted by cellular communications data.

4. The data message management system according to claim 3 in which the data messages are constituted by voice data.

5. The data message management system according to claim 3 in which the data messages are constituted by message protocol data.

6. The data message management system according to claim 3 in which the data messages are constituted by General Packet Radio Service (GPRS) data, Wireless Application Protocol data (WAP) or any cellular communication data addressable to a cell phone.

7. The data message management system according to claim 3 in which:

the participating message message originating client of the one or more participating message originating clients is a phone device, such as a cell phone, a personal digital assistant (PDA) or a computer;

the addressee client is an addressee client phone;

the outgoing data message is an outgoing phone data message;

the participating message handling server is constituted by a cellular service provider;

the cellular service provider being adapted to:

intercept an outgoing phone data message sent to an addressee client phone associated with that cellular service provider;

compare the sender information in respect of the outgoing phone data message to a database of permitted callers in respect of the addressee client phone kept by the cellular service provider;

if the comparison is positive, to route the outgoing phone data message directly to the addressee client phone; and if the comparison is negative, to automatically implement a registration process by means of which originating client phone data may be registered on the database of permitted callers;

the cellular service provider being adapted, in the registration process, to generate a form request message and send the form request message to the originating client phone, the form request message being adapted to cause the originating client phone to respond with a form request response;

the form request message being seeded with a program that drives the originating client phone to send a form request response back to the cellular service provider;

the cellular service provider being adapted, if a positive form request response is received, to automatically generate a registration form and to send the registration form back to the originating client phone for completion in a manual input step, the registration form containing a forced manual input mechanism that compels a manual response;

the registration form being seeded with a program that drives the originating client phone to send the completed form back to the cellular service provider on completion of the manual input process;

the cellular service provider being adapted to validate an input code and if valid, to generate and send an authorization request to the addressee client phone;

the addressee client phone being adapted to display the authorization request as a form for the manual input process, the authorization request being seeded with a program that drives the addressee client phone to send a database modification authorization to the cellular service provider if access is to be granted to register the originating client phone on the permitted caller database; and the cellular service provider being adapted to send a retransmission advice to the originating client phone, the retransmission advice being seeded with a program that drives the originating client phone to retransmit the outgoing phone data message to the addressee client phone.

8. A method of managing the transmission of data messages between normally un-connected message clients in a data messaging system including a participating message handling server and one or more participating message originating clients, which, in use, are configured to transmit one or more data messages to addressee clients, which need not necessarily be participants in the system, the method performed by a device and comprising the steps of:

programming each participating message originating client of the one or more participating message originating clients with an outgoing message management program including a message routing program and the one or more user selected message handling rules to be associated with outgoing data messages; and programming the participating message handling server with a server message management program including the message routing program and a rules management program, which is adapted to interpret the one or more user-selected message handling rules associated with data messages routed to the server in use and to route the data messages, using the message routing program, in accordance with the one or more user-selected message handling rules associated with each data message of the outgoing data messages, the outgoing message management program being adapted to operate in conjunction with the data messaging system in use on the participating message originating client of the one or more participating message originating clients to permit the selection, by one or more participating users of the participating message originating client of the one or more participating message originating clients prior to transmission of an outgoing data message, of the one or more user selected message handling rules to be associated with that outgoing data message;

associating the one or more user-selected message handling rules with the outgoing data message on transmission thereof to one or more addressee message clients;

associating the message routing program with each outgoing data message that has a message handling rule associated therewith, on transmission of that outgoing data message to the one or more addressee message clients, the message routing program being adapted to remain associated with the outgoing data message and all data messages linked thereto and to direct all the data message to the participating message handling server such that the outgoing data messages with their associated message handling rules and all data messages transmitted by addressee clients in response to the outgoing data message are routed through the participating a message handling server; and programming the participating message handling server to control the transmission of reply data messages to the participating originating message client of the one or more participating message originating clients in accordance with the message handling rules associated with the outgoing data message.

9. A method of managing a transmission of data messages between normally un-connected message originating clients in a data messaging system including a participating message handling server and a participating message addressee client in which, a message originating client of the normally un-connected message originating clients is a phone device, such as a cell phone, a personal digital assistant (PDA) or a computer;

the addressee client is an addressee client phone;

the outgoing data message is an outgoing phone data message; and the participating message handling server is constituted by the cellular service provider associated with the addressee client phone;

the method comprising the steps of:

programming the cellular service provider to:

intercept any phone data message sent to an addressee client phone associated with that cellular service provider;

compare the sender information in respect of the outgoing phone data message to a database of permitted callers in respect of the addressee client phone kept by the cellular service provider;

when the comparison is positive, routing the outgoing phone data message directly to the addressee client phone; and when the comparison is negative, automatically implementing a registration process by means of which originating client phone data may be registered on the database of permitted callers;

programming the cellular service provider to, in the registration process:

generate a form request message and send the form request message to the originating client phone, the form request message being adapted to cause the originating client phone to respond with a form request response and seeded with a program adapted to drive the originating client phone to send a form request response back to the cellular service provider;

when a positive form request response is received, to automatically generate a registration form and to send the registration form back to the originating client phone for completion in a manual input step, the registration form containing a forced manual input mechanism that compels a manual response and seeding the registration form with a program adapted to drive the originating client phone to send the completed registration form back to the cellular service provider on completion of the manual input process; and when a completed registration form is received, to validate an input code and when valid, to generate and send an authorization request to the addressee client phone;

programming the addressee client phone to display the authorization request as a form for the manual input process, the authorization request being seeded with a program that drives the addressee client phone to send a database modification authorization to the cellular service provider when access is to be granted to register the originating client phone on the permitted caller database; and programming the cellular service provider to send a retransmission advice to the originating client phone, the retransmission advice being seeded with a program that drives the originating client phone to retransmit the outgoing phone data message to the addressee client phone.

* * * * *